(12) United States Patent
Khare et al.

(10) Patent No.: US 7,473,436 B1
(45) Date of Patent: Jan. 6, 2009

(54) FUNCTIONALIZATION OF CARBON NANOTUBES

(75) Inventors: Bishun N. Khare, Fremont, CA (US); Meyya Meyyappan, San Jose, CA (US)

(73) Assignees: The United States of America as represented by the Administrator of the National Aeronautics and Space Administrator, Washington, DC (US); SETI Institute, Mountain View, CA (US)

( * ) Notice: Subject to any disclaimer, the term of this patent is extended or adjusted under 35 U.S.C. 154(b) by 651 days.

(21) Appl. No.: 10/828,524

(22) Filed: Apr. 5, 2004

Related U.S. Application Data (63) Continuation-in-part of application No. 10/320,698, filed on Dec. 13, 2002, now Pat. No. 7,276,266.

(51) Int. Cl.
  C23C 16/00 (2006.01)
  H05H 1/00 (2006.01)
  H05H 1/24 (2006.01)
  B05D 3/14 (2006.01)
  B05D 3/00 (2006.01)
  C23C 8/00 (2006.01)
  C23C 14/00 (2006.01)

(52) U.S. Cl. .............. 427/248.1; 427/533; 427/535; 427/538; 427/562; 427/569; 427/575; 427/576; 427/585; 427/255.24; 427/255.26; 427/294; 427/903

(58) Field of Classification Search .............. None
See application file for complete search history.

(56) References Cited

U.S. PATENT DOCUMENTS 3,870,610 A * 3/1975 Baird et al. .................. 204/165
5,346,683 A 9/1994 Green et al. .............. 423/447.2
5,698,175 A 12/1997 Hiura et al. .............. 423/447.1
6,033,582 A * 3/2000 Lee et al. .................... 216/37
6,167,835 B1 * 1/2001 Ootera et al. ............ 118/723 E
6,263,830 B1 * 7/2001 Kamarehi et al. ... 118/723 MW (Continued)

OTHER PUBLICATIONS

E. T. Mickelson et. al, "Florination of Single-Wall Carbon Nanotubes," Chem. Phys. Lett. vol. 296, pp. 188-194 (1998).

(Continued)

*Primary Examiner*—Timothy Meeks
*Assistant Examiner*—Kelly M Stouffer
(74) *Attorney, Agent, or Firm*—John F. Schipper; Robert M. Padilla (57) ABSTRACT

Method and system for functionalizing a collection of carbon nanotubes (CNTs). A selected precursor gas (e.g., $H_2$ or $F_2$ or $C_nH_m$) is irradiated to provide a cold plasma of selected target species particles, such as atomic H or F, in a first chamber. The target species particles are directed toward an array of CNTs located in a second chamber while suppressing transport of ultraviolet radiation to the second chamber. A CNT array is functionalized with the target species particles, at or below room temperature, to a point of saturation, in an exposure time interval no longer than about 30 sec. *Discrimination against non-target species is provided by (i) use of a target species having a lifetime that is much greater than a lifetime of a non-target species and/or (2) use of an applied magnetic field to discriminate between charged particle trajectories for target species and for non-target species.

10 Claims, 7 Drawing Sheets

U.S. PATENT DOCUMENTS

| | | | |
|---|---|---|---|
| 6,346,303 B1 * | 2/2002 | Shih et al. | 427/571 |
| 6,417,111 B2 * | 7/2002 | Nishikawa et al. | 438/710 |
| 6,444,864 B1 | 9/2002 | Knight et al. | 585/241 |
| 6,479,028 B1 | 11/2002 | Kaner et al. | 423/414 |
| 7,276,266 B1 * | 10/2007 | Khare et al. | 427/533 |
| 2002/0197474 A1 * | 12/2002 | Reynolds | 428/398 |
| 2003/0048056 A1 * | 3/2003 | Kitamura et al. | 313/311 |
| 2005/0008561 A1 * | 1/2005 | Fischer et al. | 423/447.1 |

OTHER PUBLICATIONS

J. Chen et. al, "Solution Properties of Single-Walled Carbon Nanotubes," Science, vol. 282, pp. 95-98 (1998).

\* cited by examiner

FUNCTIONALIZATION OF CARBON NANOTUBES

CROSS REFERENCE TO RELATED APPLICATIONS

This application is a continuation-in-part of prior application Ser. No. 10/320,698, filed Dec. 13, 2002 now U.S. Pat. No. 7,276,266.

FIELD OF THE INVENTION

This invention is related to addition of functional groups to collections of carbon nanotubes.

BACKGROUND OF THE INVENTION

Carbon nanotubes (CNTs) have attracted much attention, due to their extraordinary mechanical properties and their unique electronic properties. A CNT is topologically equivalent to a two-dimensional graphite sheet rolled into a cylinder, with a cylinder diameter as small as 0.7 nanometers (nm) and with a cylinder length up to several microns ($\mu$m). A CNT can be single walled (SW) or multiple walled (MW) and can also be fabricated as a nanofiber or other CNT structure. A CNT can be characterized by its chiral vector components (n,m), which helps determine tube diameter, electronic properties and other properties. Depending upon the chirality (n-m divisible by 3 or otherwise), a CNT can be conducting (metal-like) or semiconducting.

CNTs are being studied for applications in a high strength/low weight composites, membranes, mechanical filters, body armor, space suits, electronics, nano-electro-mechanical systems, heat exchange systems, radiators, chemical sensors, physical sensors, actuators, data storage, computers and other applications. In some of these applications, chemical functionalization (addition of one or more specified chemical groups to a basic structure) may be necessary to alter the CNT properties for particular applications. For example, functionalization of the CNT tip or the side walls with suitable probe molecules can provide chemical sensors that recognize certain target species and ignore all others. Development of functional composites may require functionalization of a collection of CNTs to allow the tubes to be dispersed more easily in a host matrix.

An ideal functionalization process should be clean, produce relatively little residue for disposal, should be efficient, selective, and reasonably fast, should be scalable to large scale production, should not require use of complex apparatus to produce the target species or attach the species to the CNTs, and should not require complex chemical processing.

The CNT functionalization processes reported in the literature use wet chemical procedures and work with liquids or vapors, to which the CNTs are exposed. An example is use of hot flowing fluorine to attach fluorine atoms to CNTs, as reported by E. T. Michelson et al in Chem. Phys. Lett. vol 296 (1998) 188. Large quantities of wet chemicals are often required, with most of the chemicals becoming residues that must be disposed of under hazardous substance guidelines. Recycling of the chemicals used is seldom an option.

What is needed is a CNT functionalization process that is "dry", produces relatively little residue for clean-up, is flexible enough to be used for large numbers of chemical functional groups, is reasonably selective, is scalable, and does not require use of complex apparatus or complex processing to achieve functionalization of a collection of CNTs.

SUMMARY OF THE INVENTION

These needs are met by the present invention, which provides a selective, scalable approach, not involving "wet" chemistry, for functionalization of a collection of CNTs with any of a large class of elements and compounds, including hydrogen, the alkali metals, selected hydrocarbons, selected organic species, and the halogens. Taking hydrogen as an example of a target species, atomic hydrogen is produced by applying a glow discharge to a molecular hydrogen source to provide a cold plasma, and using a strong pressure differential to direct the atomic hydrogen thus produced toward the CNTs. Atomic hydrogen that is not received by the CNTs can be allowed to recombine and can be recovered for another glow discharge cycle.

In another approach, the system takes account of the different lifetimes for different functional species produced by a glow discharge, to discriminate in favor of, or against, receipt of an enhanced or reduced concentration of a target species by varying the distance between the glow discharge region and a receptor for the target species.

In another approach, a magnetic field is applied between the glow discharge region and the target species receptor to discriminate against electrically charged species other than the target species.

DESCRIPTION OF PREFERRED MODES OF THE INVENTION

Figure 1:
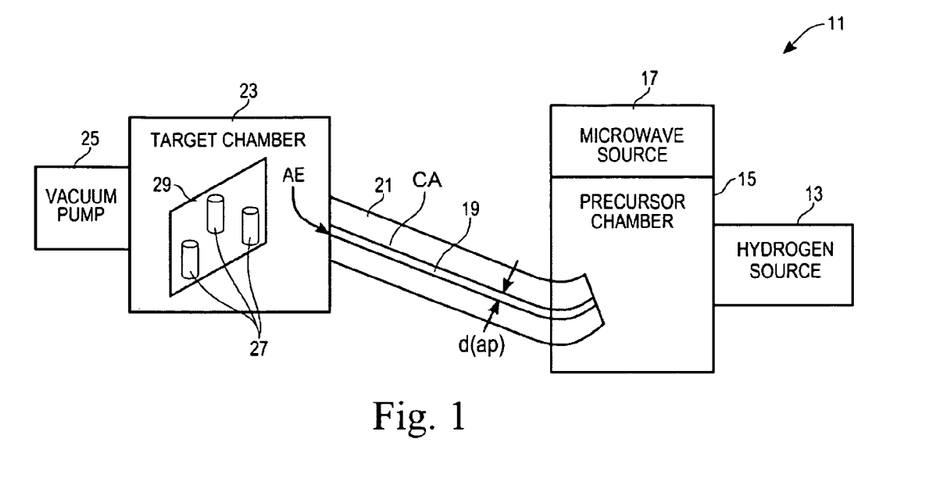
FIGS. 1, 6 and 7 illustrate systems for practicing the invention.

FIG. 1 illustrates a system 11 for practicing the invention to provide hydrogen as the species for functionalization of the CNTs. The system 11 includes a precursor source 13 that feeds hydrogen (e.g., molecular hydrogen, with a purity of 99.9999 percent or better) to a partially evacuated precursor chamber 15. Molecular hydrogen in the precursor chamber 15 is irradiated by a microwave source, an inductive heating source, a radio frequency capacitive heating source, an electron cyclotron resonance heating source, a direct current heating source or other suitable radiation source 17, for example, a McCarroll cavity operating at 2.45 GHz and powered by an Opthos microwave generator. The radiation source 17 provides sufficient radiant energy to produce a cold plasma, in which the free electrons, with typical temperatures $T_e \approx$ a few electron volts (1 eV corresponds to T=11,604 K), are much hotter than the resulting partially ionized gas, which has typical temperatures $T_g \approx$ 350-1000 K. This discharge produces electrons by ionization and radicals, especially atomic hydrogen as a precursor particle, by dissociation.

Part of the atomic hydrogen thus produced is received in an aperture 19 in a plug 21 of Teflon or other suitable material having an outer diameter of 5-25 mm, where the aperture 19 has a selected diameter (e.g., d(ap)≈1 mm), has a selected length (e.g., 5-25 mm, or greater if desired), and connects the precursor chamber 15 with a target chamber 23 and associated vacuum pump 25 that contains a collection of CNTs d7, assembled in an array on a substrate 29, such as $CaF_2$. The substrate 29 is located adjacent to an aperture exit AE of the aperture 19, is oriented substantially perpendicular to the particle flow direction within the aperture at the aperture exit, and coated with purified CNTs. At appropriate time intervals, the substrate 29 can be removed from the target chamber 23 to harvest the functionalized CNTs. Purity of the CNTs used here is monitored using transmission electron microscopy which verifies that troublesome substances, such as Fe nanoparticle, are removed by the purification process (described in Khare et al., Nano Lett. Vol. 2 (2002) pp. 73-77, incorporated by reference herein).

The precursor chamber 15 and the target chamber 23 are maintained at pressures of 100-1000 μm Hg and 1-10 μm Hg (optionally including an inert carrier gas, such as including $N_2$, Ne or Ar), respectively, so that a large pressure ratio (100:1 to 500:1) exists between the two chambers. This large pressure ratio will encourage most of the atomic hydrogen produced in the precursor chamber 15 to move relatively quickly into and along the aperture 19 and to collide, react with and functionalize the CNTs 27. This functionalization process has been performed at room temperature and at temperatures down to liquid nitrogen temperatures.

Figure 2:
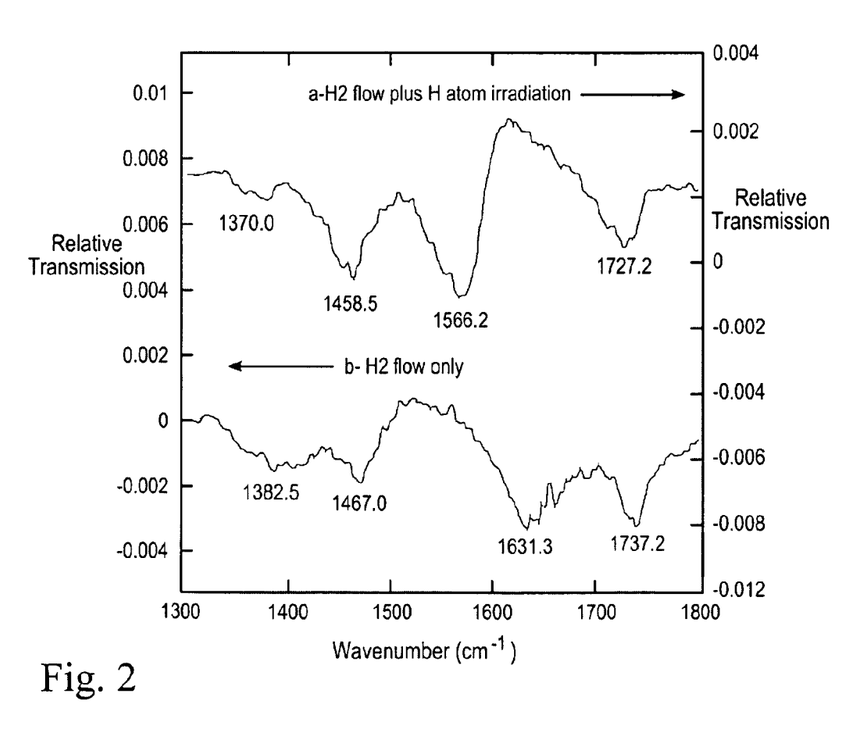
FIG. 2 graphically illustrates FTIR spectra of non-functionalized CNTs and CNTs functionalized according to the invention.

FIG. 2 shows FTIR spectra for wavenumbers $v'=1300$-$1800$ $cm^{-1}$, illustrating relative transmission for a CNT array (i) exposed to $H_2$ plus atomic H produced by a glow discharge and (ii) exposed to only $H_2$ (no discharge). C—H bending modes at wavenumbers of about $v'=1370$ $cm^{-1}$ and $v'=1459$ $cm^{-1}$ are manifest in the glow discharge curve, as expected from other experimental data. Two other spectral features occur at $v'=1566$ $cm^{-1}$ and $v'=1727$ $cm^{-1}$, which may correspond to C—C interaction in unfunctionalized CNTs and to C═C or C═O interaction in any carbonyl groups that are present. CNTs are known to absorb O atoms and hydrocarbons, such as $CH_4$ molecules easily, even at very low pressures. Therefore, O atoms and/or $CH_4$ molecules may be present as trace impurities in the CNTs. The intensities of the extrema in the discharge curve did not change for exposure time intervals of between one and seven hours.

Figure 3:
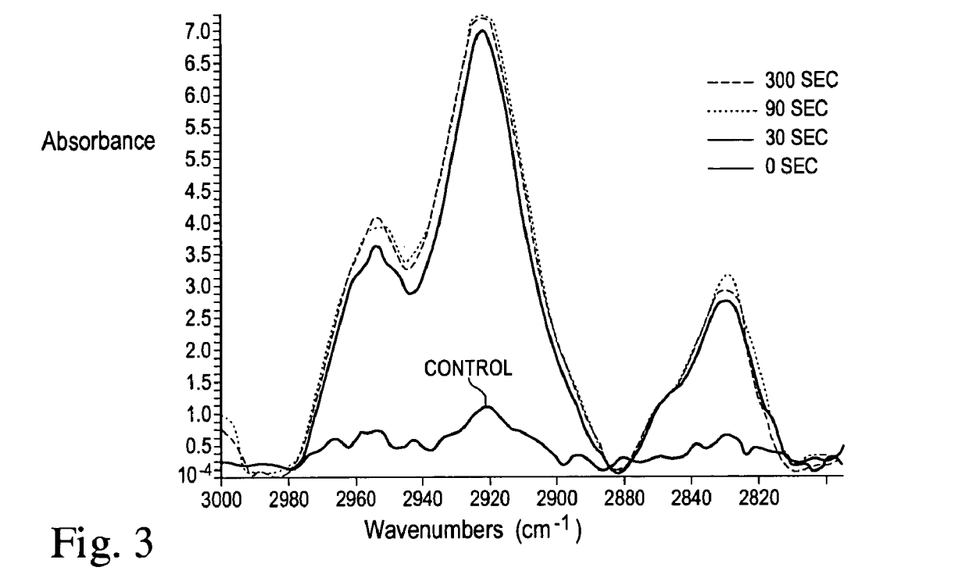
FIG. 3 graphically illustrates saturation of CNT functionalization, using hydrogen, at various times.

This approach provides substantially complete hydrogen functionalization of an assembly of CNTs, in a time interval as small as 30 sec. This is shown in FIG. 3, which is a graph illustrating variation of optical absorbance in CNT samples exposed to atomic hydrogen for a selected infrared region ($v'=2820$-$3000$ $cm^{-1}$) of the spectrum corresponding to C—H stretching bonds in $CH_m$ (m=2, 3). The CNT samples were exposed for time intervals of 0 sec (control specimen), 30 sec, 90 sec and 300 sec. The absorption values for 30, 90 and 300 sec are substantially the same and are a factor of about 6 higher than the corresponding values for the control specimen, indicating that the hydrogen functionalization of CNTs saturates in an exposure time interval no greater than 30 sec. The absorption differences between the exposure time intervals Δt=30, 90 and 300 sec in FIG. 3 are very small, but each of these absorption levels is much greater than the corresponding absorption values for the control sample level. Further experiments indicate that the hydrogen functionalization of CNTs saturates in a time interval that may be less than 30 sec. Chemisorption of atomic hydrogen onto CNT side walls is a slightly exothermic process, with an estimated energy of about 26 kcal/mole.

FIG. 3 graphically illustrates the FTIR spectra obtained for a control sample (0 sec) and samples exposed for time intervals Δt=30, 90 and 300 sec. The band at $v'=2924$ $cm^{-1}$ (corresponding to a wavelength λ=3.4 μm) arises from C—H stretching bonds and is in reasonable agreement with a computer-modeled value of about $v'=2900$ $cm^{-1}$. The unmodified SWCNTs do not have any infrared (IR) modes near $v'=2900$ $cm^{-1}$, although a small background level of C—H stretching mode is present in the control sample, as shown. As the SWCNTs are exposed to the H atoms, hydrogen functionalization of the nanotubes rapidly saturates, as indicated in the preceding. Subsidiary features at wavenumbers $v'=2955$ $cm^{-1}$, $v'=2871$ $cm^{-1}$, $v'=2863$ $cm^{-1}$, and $v'=2854$ $cm^{-1}$ are typical of C—H stretching modes in $CH_m$ groups, which are present in small amounts in $H_2$ gas, even after liquid nitrogen trapping. Methane ($CH_4$) is known to be easily absorbed onto SWCNTs, and this may contribute to the background manifested by the control sample. Exposure of identical samples of SWCNTs to $H_2$ molecules (no discharge present, but with trace amounts of hydrocarbon impurities) under identical conditions for identical time intervals produced the same peaks, but at peak intensities several orders of magnitude smaller. Therefore, the absorption results in FIG. 3 can be attributed to functionalization of SWCNTs with atomic hydrogen, exposed to the plasma.

Experiments to demonstrate substantial functionalization of single wall CNTs (SWCNTs) with atomic hydrogen have been performed. Molecular hydrogen gas ($H_2$, 99.9999 percent purity) was passed through a liquid nitrogen trap to eliminate water and hydrocarbon impurities, with an $H_2$ pressure of about 500 μm Hg in the precursor chamber 15. The pressure in the CNT chamber 23 was about 1 μm Hg. The $H_2$ precursor gas was irradiated, and a beam of H particles was directed along a central axis CA of the aperture 19 toward an array of SWCNTs on the substrate 29 in the CNT chamber 23. The SWCNTs were produced by the HiPCO process and were purified, as described in the Khare et al article, ibid. The approach extends to other procedures, in addition to HiPCO, for producing SWCNTs and MWCNTs.

Before functionalization with H, the SWCNTs were baked in a vacuum for 30 minutes at a temperature T=810° C. to remove hydrocarbon impurities. A Thermo Nicolet Nexus 670 Fourier transform infrared (FTIR) spectrometer at 4 $cm^{-1}$ resolution and a Perkin Elmer UV-VIS-NIR spectrometer (model Lambda 900) were used to analyze control (nonfunctionalized) and functionalized SWCNT samples.

Recombination of atomic hydrogen to produce molecular hydrogen, as well as other reactions, will also produce ultraviolet radiation within the precursor chamber 15, and such radiation is known to break C—H bonds in hydrogenated structures such as hydrogenated CNTs. For this reason, the aperture 19 in the plug 21 is aligned with an initial and/or final aperture segment that is curvilinear (referred to herein as "off-axis alignment"), or is otherwise configured so that little or no uv radiation is received by the target chamber 23 from the precursor chamber 15.

Figure 4:
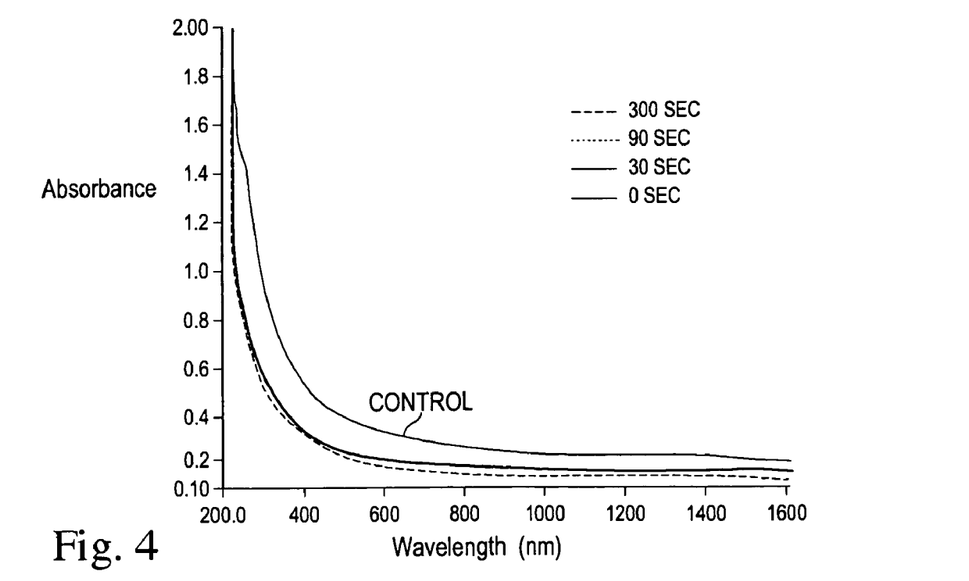
FIG. 4 graphically illustrates absorption of the samples from FIG. 2 in portions of the ultraviolet, visible and infrared spectrum.

Recent theoretical studies by Bauschlicher et al, reported in Nano Lett. vol. 1 (2001) pp. 223 and in Nano Lett. vol. 2 (2002) p. 337, indicate that the maximum hydrogen coverage on the outside of a CNT is about 50 percent, due to $sp^3$ hybridization. Ultraviolet absorption, arising from π→π* excitations in a CNT covered with H atoms, are expected to be reduced to about half the absorption values found for "bare" CNTs with no H atoms present. FIG. 4 shows UV-VIS-NIR absorption data for the same samples as shown in FIGS. 2 and 3. The spectra are featureless for CNTs having varying diameters and bandgaps. The decrease in UV absorption intensity is consistent with decrease in the fraction of C—C π bonds present, as would be expected. These UV-VIS-NIR data are consistent with the IR results of FIG. 3 and supports the hypothesis that the SWCNT data, shown in FIG. 3, indicate substantial functionalization of these CNTs with atomic hydrogen.

This approach uses a glow discharge or cold plasma irradiation of the precursor molecules (here, $H_2$) to provide functionalization of CNTs. The procedure is a clean, low temperature process that requires a relatively small amount of precursor gas (here, $H_2$) and uses relatively high efficiency plasma production. A cold plasma process can be used for production of single species atomic halogens, beginning with a precursor gas such as $F_2$, $Cl_2$, $Br_2$ or $I_2$. A cold plasma process can be used for production of single species atomic alkali metals (single valence), such as Li, Na, K, Rb and Cs. A cold plasma process can also be used for production of low atomic weight hydrocarbons, such as $C_nH_{2n}$, $C_nH_{2n+1}$, and $C_nH_{2n+2}$ (n=1, 2, 3) and for organic species such as dichlorocarbene ($H_2CCl_2$), although the species selectivity here will not be high. The precursor gas can be irradiated using dc, radiofrequency, microwave, or inductive or electron cyclotron resonance (ECR) discharges.

Multiple wall CNTs can also be functionalized using the approaches disclosed here, although it is likely that the outer or exposed layer(s) of CNTs in the initial structure will be the primary sites for such functionalization.

Figure 5:
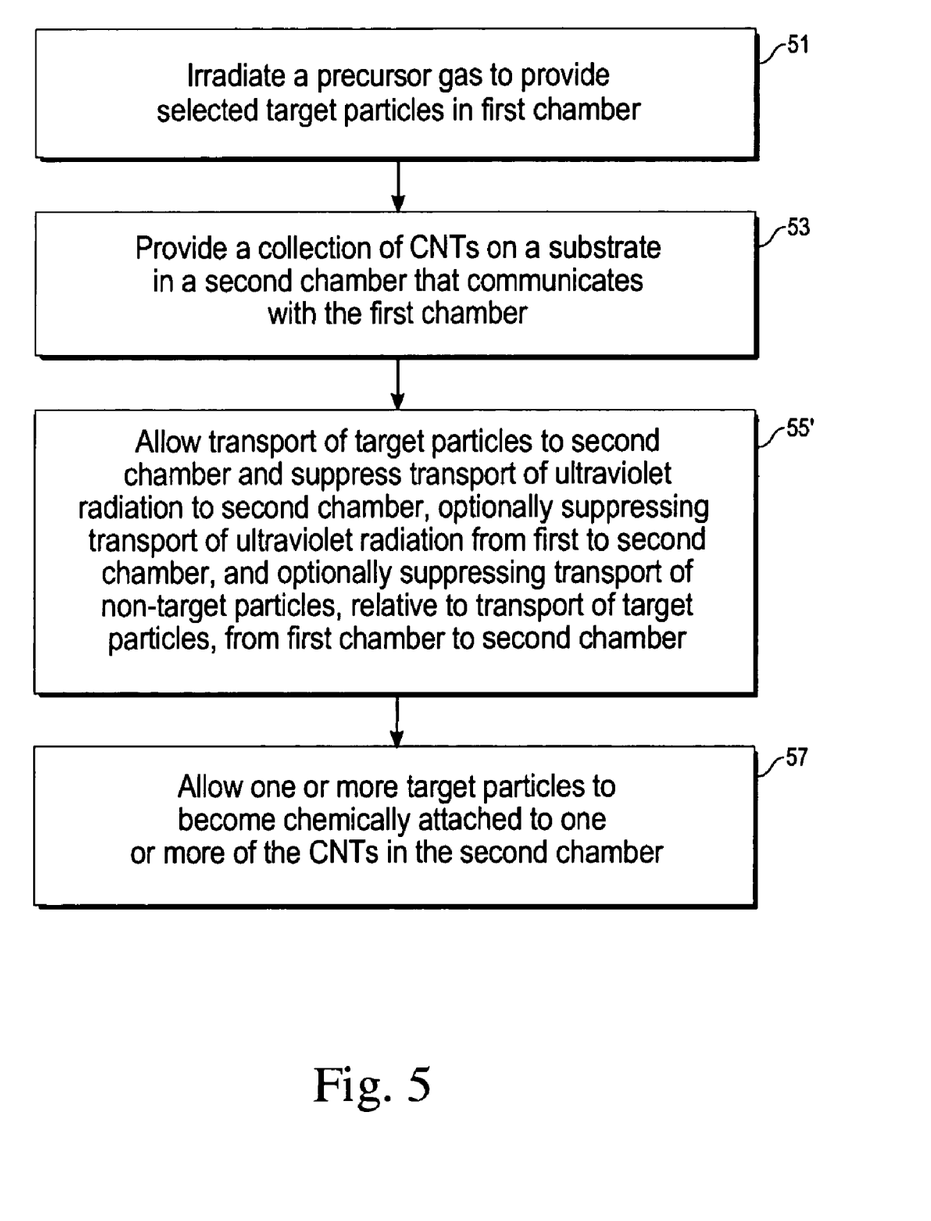
FIG. 5 is a flow chart of a procedure for practicing the invention.

FIG. 5 is a flow chart illustrating a procedure for practicing the invention. In step 51, a selected precursor gas is irradiated to provide selected target particles in a first chamber. In step 53, a collection of CNTs on a selected substrate is provided in a second chamber that is in fluid communication with the first chamber. In step 55', a transport of target particles from the first chamber to the second chamber is allowed. Optionally, the first chamber-to-second chamber communication mechanism is configured to suppress transport of ultraviolet radiation from the first chamber to the second chamber. Optionally, transport of non-target particles, relative to transport of target particles from the first chamber to the second chamber is suppressed, using techniques discussed in connection with FIG. 8 or FIG. 9 in the following. In step 57, one or more of the target particles is allowed to become chemically attached to one or more CNTs within the second chamber.

Figure 6:
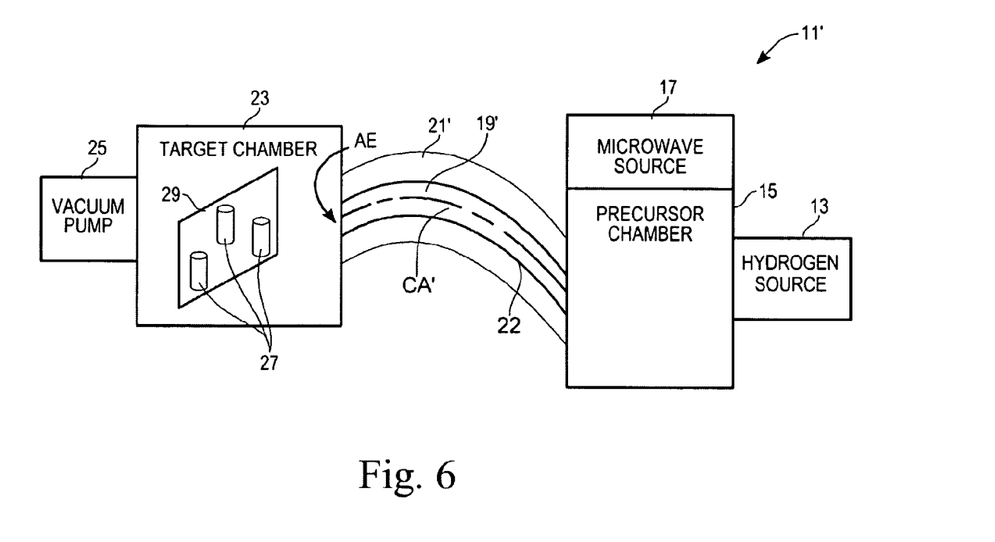

Another system 11' of suppressing transport of uv radiation from the precursor chamber 15 to the target chamber 23 is illustrated in FIG. 6. An elongated aperture 19' in a plug 21' is provided with a curvilinear central axis CA' having substantial curvature, rather than with the linear or straight axis illustrated in FIG. 1, so that no radiation, and more particularly no uv. Radiation, can travel in a single straight line in moving from the precursor chamber 15 to the target chamber 23. Optionally, where the aperture axis is linear or curvilinear, part or all of the interior or side walls of the aperture 19' are lined with a substance 22 that absorbs uv. Radiation and that, in response to such absorption either (i) does not emit radiation or (ii) emits only radiation at infrared or lower energies that do not cause C—H or C—C bond breakage in CNTs or functionalized CNTs.

Figure 7:
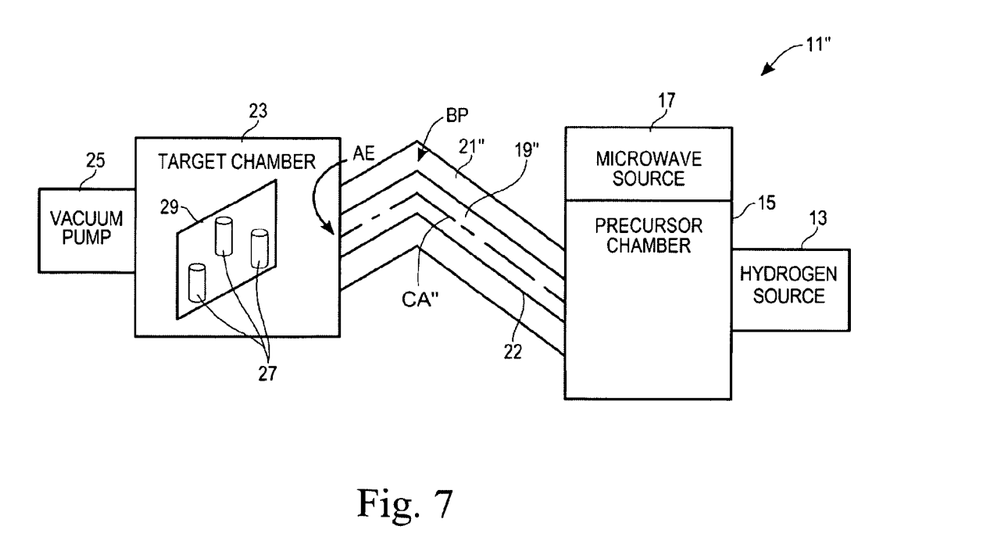

Another system 11" of suppressing transport of uv radiation from the precursor chamber 15 to the target chamber 23 is illustrated in FIG. 7. An elongated aperture 19" is provided with a central axis CA" that includes two or more linear (or curvilinear) segments that are joined together at one or more bend points BP, at each of which the directions of the two contiguous segments are substantially different. With this configuration, no radiation (ultraviolet or other wise) can travel in a single straight line in moving from the precursor chamber 15 to the target chamber 23. Again, part or all of the interior or side walls of the aperture 19" are lined with a substance 22 that absorbs uv. Radiation and that, in response to such absorption, either (i) does not emit radiation or (ii) emits only radiation at infrared or lower energies that do not cause C—H or C—C bond breakage in CNTs or functionalized CNTs.

Part of the atomic hydrogen thus produced is received in an aperture 19 in a plug 21 of Teflon or other suitable material having an outer diameter of 5-25 mm, where the aperture 19 has a selected diameter (e.g., d(ap)≈1 mm), has a selected length (e.g., 5-25 mm, or greater if desired), and connects the precursor chamber 15 with a target chamber 23 that contains a collection of CNTs 27, assembled in an array on a substrate 29, such as $CaF_2$. The substrate 29 is located adjacent to an aperture exit AE of the aperture 19, is oriented substantially perpendicular to the particle flow direction within the aperture at the aperture exit, and coated with purified CNTs. At appropriate time intervals, the substrate 29 can be removed from the target chamber 23 to harvest the functionalized CNTs and can be replaced by another substrate including non-functionalized CNTs. Purity of the CNTs used here is monitored using transmission electron microscopy, which verifies that troublesome substances, such as Fe nano-particle, are removed by the purification process (described in Khare et al, Nano Lett. vol. 2 (2002) pp. 73-77, incorporated by reference herein).

The precursor chamber 15 and the target chamber 23 are maintained at pressures of 100-1000 μm Hg and 1-10 μm Hg (optionally including an inert carrier gas, such as including $N_2$, Ne, Ar, Xe and/or Kr), respectively, so that a large pressure ratio (100:1 to 500:1) exists between the two chambers. This large pressure ratio will encourage most of the atomic hydrogen produced in the precursor chamber 15 to move relatively quickly into and along the aperture 19 and to collide, react with and functionalize the CNTs 27. This functionalization process has been performed at room temperature and at temperatures down to liquid nitrogen temperatures.

FIG. 2 shows FTIR spectra for wavenumbers ν'=1300-1800 $cm^{-1}$, illustrating relative transmission for a CNT array (i) exposed to $H_2$ plus atomic H produced by a glow discharge and (ii) exposed to only $H_2$ (no discharge). C—H bending modes at wavenumbers of about ν'=1370 $cm^{-1}$ and ν'=1459 $cm^{-1}$ are manifest in the glow discharge curve, as expected from other experimental data. Two other spectral features occur at ν'=1566 $cm^{-1}$ and ν'=1727 $cm^{-1}$, which may correspond to C—C interaction in unfunctionalized CNTs and to C=C or C=O interaction in any carbonyl groups that are present. CNTs are known to absorb O atoms and $CH_m$ molecules easily, even at very low pressures, and O atoms and/or $CH_m$ molecules may be present as trace impurities in the hydrogen. The intensities of the extrema in the discharge curve did not change for exposure time intervals of between one and seven hours.

Figure 8:
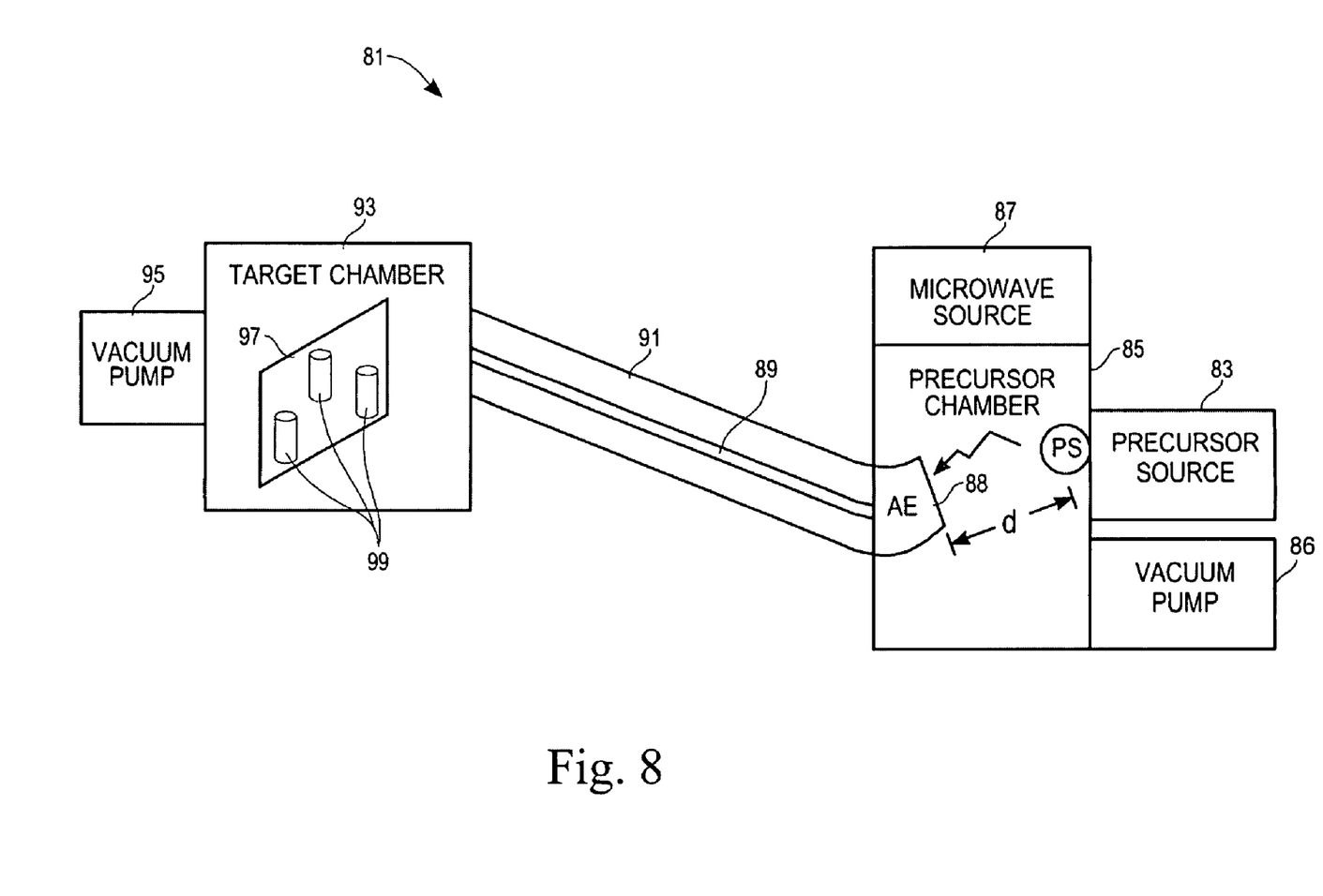
FIGS. 8, 9 and 10 illustrate other systems for practicing the invention to discriminate between target and non-target species.

FIG. 8 illustrates a system 81 for practicing the invention to provide a selected target species for functionalization of the CNTs and to discriminate against certain other species that are also produced by a radiation source, such as a microwave source. The system 81 includes a precursor source 83 that feeds a target species precursor to a partially evacuated precursor chamber 85. The target species precursor in the precursor chamber 85 is irradiated by a microwave source or other suitable radiation source 87. The radiation source 87 provides sufficient radiant energy to produce a cold plasma at a precursor production site PS, in which the free electrons, with typical temperatures $T_e \approx$ a few electron volts are much hotter than the resulting partially ionized gas, which has typical temperatures $T_g \approx 350\text{-}1000$ K. This discharge produces electrons by ionization and radicals, including the target species, as a precursor particle, by dissociation.

Assume that the target species has an excited state lifetime or other relevant lifetime $\tau$(target) that is several times as large (by a factor of $1/f > 1$) as a corresponding lifetime $\tau$(non-target) of any other (non-target) species that is produced in reasonable quantity by the radiation source 87, where f is a fraction that is less than 1. If the target species state is an excited state, the system may rely upon interaction of the target species excited state with one or more carbon atoms, or with a collection of adjacent carbon atoms, in a CNT 99 to enhance attachment of the target species. The production site PS is located at a selected distance d from an aperture entrance (AE) 88, where $$d \approx v(\text{target})\tau(\text{target}) \approx v(\text{non-target})\tau(\text{non-target}), \quad (1)$$

where v(target) and v(non-target) are representative velocities for travel in a fixed direction of the target species and the non-target species, respectively, within the precursor chamber 85.

An aperture 89, having an aperture entrance (AE) 88, in a plug 91 transports a species that appears at the aperture entrance through the aperture, to a target chamber 93 in which an array of one or more CNTs 99 is provided to be functionalized. The precursor chamber 85 and the target chamber 93 are preferably maintained at a pressure of 100-1000 μm Hg and 1-10 μm Hg, respectively, by one or more vacuum pumps 95 connected to the target chamber. Optionally, the precursor chamber 85 also has a vacuum pump 86 connected thereto. The array of CNTs 99 is preferably positioned so that a target species that passes through the aperture 89 will encounter at least one of the array of CNTs.

If the estimated initial densities of the target species and the non-target species in the precursor chamber 85 are $\rho_0$(target) and $\rho_0$ (non-target), respectively, a reasonable estimate of the ratio □ of non-target species density and target species density arriving at or near the aperture entrance 88 in the plug 91 is $$\Box = \{\rho_d(\text{non}-\text{target})/\rho_d(\text{target})\}^*  \quad (2)$$
$$\{\rho_0(\text{non}-\text{target})/\rho_0(\text{target})^* \exp[-d/\{v(\text{non}-\text{target})\tau(\text{non}-\text{target}) + d/\{v(\text{target})\tau(\text{target})\}]$$

The ratio of species velocities, v(non-target)/v(target), is of the order of 1 so that the magnitude of the first exponential term is of the order of (1/f) (which is >>1) times the magnitude of the second exponential term. The density ratio $$\Box \approx \{\rho_0(\text{non-target})/\rho_0(\text{target})\} \cdot \exp[(1-1/f)d/\{v(\text{target})\tau(\text{target})\}] \quad (3)$$

The exponential factor in Eq. (3) is negative and has a magnitude much larger than 1 so that the ratio □ is substantially reduced relative to its value (pre-exponential factor) where species lifetime is not utilized to reduce the density of non-target species at the aperture entrance.

Figure 9:
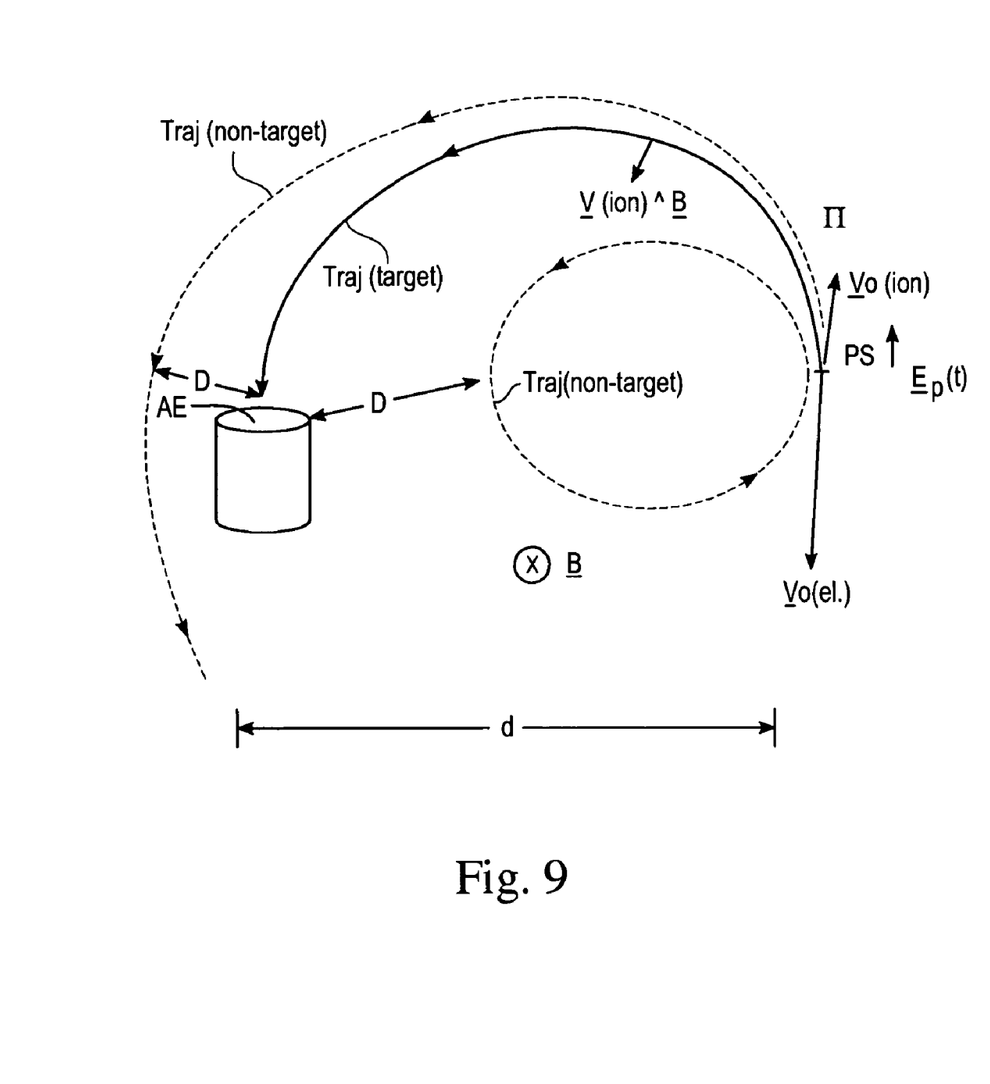

Some of the target and non-target species, such as $e^-$, $NH^+$, $NH^{++}$, and $NH_2^+$, may have associated net electrical charges, and another approach for discrimination against non-target species can be applied. FIG. 9 illustrates use of a constant applied magnetic field B (in Gauss) to discriminate against arrival of electrically charged, non-target species at the aperture. Where a charged particle, having a mass m (in grams), an electrical charge Ze (in esu) and an initial velocity vector $v_0$ (in cm/sec, perpendicular to the direction of the magnetic field B is initially created at a production site PS, application of the magnetic field B will cause the charged particle to move according to the force equation $$m\{dv/dt\} = Ze\{E + v \hat{} B\}, \quad (4)$$

where $v \hat{} B$ is a vector cross product and ions ($Z = Z_{ion} \geq 1$) and electrons ($Z = Z_{el} = -1$) are accounted for separately. Where a charged particle is given an initial velocity vector $v_0$ in a plane Π perpendicular to the direction of the magnetic field B, the particle will follow a circular path with angular frequency of gyration $\omega_g$ and (circular) radius of gyration $r_g$ given by $$\omega_g = Ze|B|/mc \quad (5)$$

$$r_g = m \cdot v_p c /\{Ze|B|\}, \quad (6)$$

(L. Spitzer, *Physics of Fully Ionized Gases,* Interscience Publ., New York, 1961, pp. 1-3). It is assumed here for simplicity that the path of the charged particle is not affected by particle-particle scattering, by extraneous electromagnetic fields or by collisions with another structure.

Assume that, at the time the charged particle (ion or electron) is created at the production site PS by a radiation source (not shown in FIG. 9), a pulsed electrical field $E_p(t)$ is provided in the plane Π for a very short time interval in the general direction of a desired initial particle velocity vector $v_0$, shown in one example in FIG. 9. The pulsed electrical field $E_p$ can be provided by an extraneous E-field source, or the pulsed electrical field $E_p$ can be provided by the radiation source, and produces an initial velocity $v_0$ in a selected initial direction. As a result of application of the pulse electrical field $E_p$, the ion and electron will have initial momenta $$m_{ion} v_{0,ion} = Z_{ion} e \int E_p(t) dt \quad (7A)$$

and $$m_{el} v_{0,el} = Z_{el} e \int E_p(t) dt, \quad (7B)$$

respectively, which are oppositely directed in the plane Π, as indicated in FIG. 9. Recall that $Z_{ion} \geq 1$ and $Z_{el} = -1$.

Under the combined influence of the pulsed electrical field $E_p$ and the static magnetic field B, an ion will follow a circular trajectory Traj upward and curving toward the left, and an electron will follow a circular path downward and curving toward the right, as shown in FIG. 9. This action does not take into account the additional magnetic field, which has very small time duration and limited magnitude, created by the time variation of the pulsed electrical field $E_p(t)$, according to Maxwell's equations; this additional magnetic field is ignored here.

The magnitude of the static magnetic field B in FIG. 9 can be chosen so that (1) the circular trajectory Traj(target), having a radius of gyration $r_g \approx$ half the distance d from the production site PS to the aperture entrance AE, for an electrically charged, target species passes through the entrance to the aperture (and is optionally aligned at that point with the entrance axis of the aperture) and (2) the circular trajectory Traj(non-target) for an electrically charged, non-target species, of radius $r_g$(non-target), is no closer than a selected positive distance D from the aperture entrance AE, relying on a substantial difference of the radius $r_g = m \cdot v_0 c / \{Ze|B|\}$, for the target species and for the non-target species. Where only the non-target species is electrically charged, the circular path followed by this species would again be chosen so that (2) the circular path for an electrically charged, non-target species passes no closer than a selected positive distance D from the aperture entrance AE. Where only the target species is electrically charged, the circular path followed by this species would again be chosen so that (1) the circular path for an electrically charged, target species passes near or through the aperture entrance AE. Ideally, one chooses the distance d between the production site PS and the aperture entrance AE so that $$d(\text{target}) = 2r_g(\text{target}) \tag{8}$$

and either $$r_g(\text{non-target}) << d(\text{target})/2 \tag{9A}$$

or $$r_g(\text{non-target}) >> d(\text{target})/2, \tag{9B}$$

Preferably, the radius of gyration of the non-target species satisfies an inequality $$|r_g(\text{non-target}) - d(\text{target})/2| \geq \Delta r(\text{thr}), \tag{10}$$

where $\Delta r(\text{thr})$ is a selected positive threshold distance.

Figure 10:
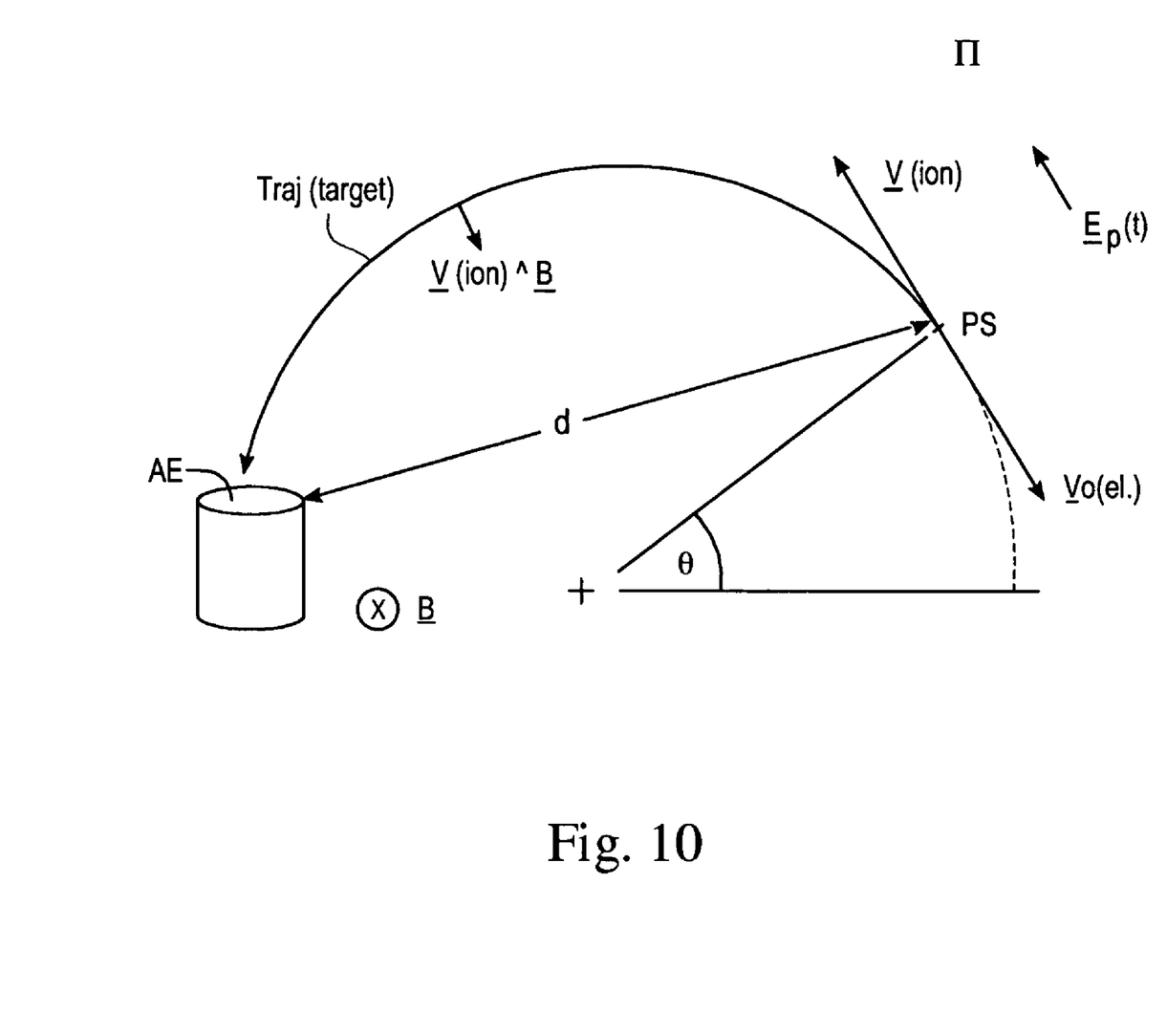

The production site PS in FIG. 9 need not be located at a distance $d = 2r_s(\text{target})$ from the aperture entrance AE. Where (i) the production site PS is located at an angle θ (0<θ<π) along a circular path that also passes through the aperture entrance AE, as illustrated in FIG. 10, (ii) the pulsed electrical field $E_p(t)$ is oriented tangent to the circular path at PS, and (iii) for a PS-AE distance of d, the magnetic field magnitude |B| is chosen so that $$r_g(\text{target}) = d \cos(\theta/2)/2, \tag{11}$$

the resulting circular trajectory for the electrically charged target species will also pass through the aperture entrance AE.

If all other parameters are held substantially constant in the system of FIG. 9, and the magnitude of the B-field and/or the magnitude of the initial velocity vector $v_0$ is varied, different "target species" will preferentially appear at the aperture entrance AE. Thus, one has in hand a method of selecting (by variation of |B| and/or of $|v_0|$) which "target species" is preferentially delivered to the aperture entrance AE.

The invention illustrated in any of FIGS. 1, 5, 6, 7, 8, 9 and/or 10 can also be used to provide functionalization where CNT targets are replaced by another suitable target, including inorganic nanowires (e.g., silicon, germanium, gallium nitride, boron nitride, indium oxide, tin oxide and zinc oxide).

What is claimed is:

1. A method for functionalizing a collection of carbon nanotubes (CNTs), the method comprising:
    irradiating a precursor gas at a selected production location to provide a plurality of particles of a selected charged particle target species in a first chamber having a first selected chamber pressure p1, and to provide a preferred initial velocity for at least one particle of the selected charged particle target species, where at least one charged non-target species particle is also present in the first chamber;
    providing a collection of CNTs on a substrate in a second chamber having a second selected sub-Torr pressure p2, where p2 lies in a range of about $0.002 \cdot p1 – 0.01 \cdot p1$;
    providing a particle communication mechanism, having a particle aperture entrance that is spaced apart from the production location by a selected distance, that allows transport of at least a portion of the particles from the first chamber to the second chamber;
    configuring the particle communication mechanism so that transport of ultraviolet radiation from said first chamber to said second chamber is suppressed;
    providing a substantially constant vector magnetic field B in the first chamber, where the magnitude and direction of the magnetic field B are chosen so that (i) a trajectory in the field B of at least one particle of the selected charged particle target species produced at the production location will pass substantially through the aperture entrance and (ii) a trajectory in the field B for at least one charged non-target species particle produced at the production location will be no closer than a positive threshold distance from the aperture entrance,
    whereby at least one particle of the selected charged particle target species becomes chemically attached to at least one of the CNTs in the second chamber, and a density of the at least one non-target species adjacent to the aperture entrance is reduced relative to a density of the selected charged particle target species adjacent to the aperture entrance.

2. The method of claim 1, further comprising:
    at a first selected time, providing a first vector value B1 of said magnetic field B for which said corresponding trajectory in the magnetic field B1 of said first selected charged particle target species is preferentially delivered to said particle aperture entrance; and
    at a second selected time that is later than the first selected time, providing a second vector value B2 of said magnetic field B for which said corresponding trajectory in the magnetic field B2 of a second selected charged particle target species is preferentially delivered to said particle aperture entrance, where the magnitude of the field B1 differs from the magnitude of the field B2.

3. The method of claim 1, wherein said transport of ultraviolet radiation from said first chamber to said second chamber is suppressed by providing an elongated aperture, having an aperture central axis and an aperture side wall and connecting said first and second chambers, further comprising arranging the aperture according to at least one of the following: (i) the aperture central axis is aligned off-axis so that little or no ultraviolet radiation that is produced within said first chamber can move in a single straight line from said first chamber to said second chamber, (ii) the aperture central axis is curvilinear, and is provided with sufficient curvature so that substantially no ultraviolet radiation that is produced within said first chamber can move in a single straight line from said first chamber to said second chamber, (iii) the aperture central axis has at least one bend point at which a direction of the central axis changes abruptly so that substantially no ultraviolet radiation that is produced within said first chamber can move in a single straight line from said first chamber to said second chamber, and (iv) at least a portion of the aperture side wall is provided with a chemical substance (iv-a) that absorbs the ultraviolet radiation and emits no radiation in response thereto or (iv-b) that absorbs the ultraviolet radiation and, in response thereto, emits radiation having an emitted energy that is lower than required to cause a bond breakage in at least one of a C—C bond and a C—H bond.

4. The method of claim 3, further comprising providing at least a portion of said aperture side wall with a chemical substance (i) that absorbs said ultraviolet radiation and emits no radiation in response thereto or (ii) that absorbs said ultraviolet radiation and, in response thereto, emits radiation having an emitted energy that is lower than required to cause a bond breakage in at least one of a carbon-carbon bond and a carbon-hydrogen bond.

5. The method of claim 1, further comprising choosing said selected charged particle target species from a group of target particle species having a non-zero electrical charge and consisting of H, Li, Na, K, Rb, Cs, F, Cl, Br, I, dichlorocarbene, $C_nH_{2n}$, $C_nH_{2n+1}$ and $C_nH_{2n+2}$, with n=1, 2 and 3.

6. The method of claim 1, wherein said step of irradiating said precursor gas comprises irradiating said precursor gas with at least one of a dc source, a radiofrequency source, a microwave source and an induction source of radiation to provide a cold plasma.

7. The method of claim 1, further comprising choosing said pressure p1 in a range 100 μm Hg$\leq$p1$\leq$1000 μm Hg.

8. The method of claim 1, further comprising choosing said pressure p2 in a range 1 μm Hg$\leq$p2$\leq$10 μm Hg.

9. The method of claim 1, further comprising allowing at least one particle of said selected charged particle target species to become chemically attached to at least one of said CNTs in said second chamber in an exposure time interval no longer than about 30 sec.

10. The method of claim 1, further comprising allowing at least one particle of said selected charged particle target species to become chemically attached to said at least one CNT at a temperature in said second chamber that is no greater than about room temperature.

* * * * *